United States Patent
Fejer et al.

(10) Patent No.: US 11,469,567 B2
(45) Date of Patent: Oct. 11, 2022

(54) NONLINEAR OPTICAL DEVICES BASED ON QUASI-PHASE-MATCHED INTERACTIONS IN DISPERSION-ENGINEERED NANOPHOTONICS

(71) Applicant: The Board of Trustees of the Leland Stanford Junior University, Stanford, CA (US)

(72) Inventors: Martin M. Fejer, Emerald Hills, CA (US); Carsten Langrock, Santa Clara, CA (US); Marc P. Jankowski, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 25 days.

(21) Appl. No.: 17/200,422

(22) Filed: Mar. 12, 2021

(65) Prior Publication Data
US 2022/0252958 A1    Aug. 11, 2022

Related U.S. Application Data

(60) Provisional application No. 62/989,332, filed on Mar. 13, 2020.

(51) Int. Cl.
*G02F 1/377* (2006.01)
*G02F 1/35* (2006.01)
*G02F 1/39* (2006.01)
*G02F 1/355* (2006.01)
*H01S 3/00* (2006.01)

(52) U.S. Cl.
CPC .......... *H01S 3/0092* (2013.01); *G02F 1/3528* (2021.01); *G02F 1/3548* (2021.01); *G02F 1/3558* (2013.01); *G02F 1/3775* (2013.01); *G02F 1/392* (2021.01); *G02F 1/395* (2013.01)

(58) Field of Classification Search
None
See application file for complete search history.

(56) References Cited

U.S. PATENT DOCUMENTS 5,036,220 A    7/1991  Byer
5,815,307 A    9/1998  Arbore
(Continued)

FOREIGN PATENT DOCUMENTS

CN         102566194         7/2012

OTHER PUBLICATIONS

M. Jankowski, C. Langrock, B. Desiatov, A. Marandi, C. Wang, M. Zhang, C. R. Phillips, M. Loncar, and M. M. Fejer, "Ultrabroadband Nonlinear Optics in Dispersion Engineered Periodically Poled Lithium Niobate Waveguides," in Nonlinear Optics (NLO), OSA Technical Digest (Optica Publishing Group, 2019). (Year: 2019).*

(Continued)

*Primary Examiner* — Rhonda S Peace
(74) *Attorney, Agent, or Firm* — Lumen Patent Firm

(57) ABSTRACT

Improved efficiency for nonlinear optical interactions is provided by using strongly confining waveguides for simultaneous imposition of dispersion design constraints at two or more dispersion orders. Quasi-phase-matching allows for phase-matching to be accomplished independently of the waveguide design, which helps provide sufficient design freedom for the dispersion design.

10 Claims, 10 Drawing Sheets fundamental mode second harmonic mode

(56) References Cited

U.S. PATENT DOCUMENTS 7,864,409 B2  1/2011  Yang
2002/0131156 A1  9/2002  Chou

OTHER PUBLICATIONS

M. Jankowski, N. Jornod, C. Langrock, B. Desiatov, A. Marandi, M. Lončar, and M. M. Fejer, "Efficient Ultra-broadband Optical Parametric Generation with Picojoule Pulse Energies," in Conference on Lasers and Electro-Optics, OSA Technical Digest (Optica Publishing Group, 2021). (Year: 2021).*

C. Wang, C. Langrock, A. Marandi, M. Jankowski, M. Zhang, B. Desiatov, M. M. Fejer, and M. Lončar, "Second-harmonic generation in nanophotonic PPLN waveguides with ultrahigh efficiencies," in Conference on Lasers and Electro-Optics, OSA Technical Digest (online) (Optica Publishing Group, 2018). (Year: 2018).*

M. Jankowski, C. Langrock, B. Desiatov, M. Loncar, and M. M. Fejer, "Spectral Broadening by Saturated Second Harmonic Generation in Nanophotonic Lithium Niobate Waveguides," in Conference on Lasers and Electro-Optics, OSA Technical Digest (Optica Publishing Group, 2020). (Year: 2020).*

Hickstein et al., "Self-organized nonlinear gratings for ultrafast nanophotonics", 2018, arXiv:1806.07547v1.

Luo et al., "Semi-nonlinear nanophotonic waveguides for highly efficient second-harmonic generation", 2018, arXiv:1809.06476v1.

Singh et al., "Broadband 200-nm second-harmonic generation in silicon in the telecom band", 2020, Light: Science & Applications 9:17.

Hickstein et al., "Self-organized nonlinear gratings for ultrafast nanophotonics", 2019, Nature Photonics I vol. 13 I 494-499.

Hickstein et al., "Self-organized nonlinear gratings for ultrafast nanophotonics", 2018, CLEO Pacific Rim.

Nitiss et al., "Broadband quasi-phase-matching in dispersion-engineered all-optically poled silicon nitride waveguides", 2020, Photonics Research, vol. 8, No. 9.

Hickstein et al., "Quasi-phase-matched supercontinuum-generation in photonic waveguides", 2017, arXiv:1710.03821v2.

Wang et al., "Ultrahigh-efficiency wavelength conversion in nanophotonic periodically poled lithium niobate waveguides", 2018, Optica, vol. 5, No. 11.

* cited by examiner fundamental mode second harmonic mode

NONLINEAR OPTICAL DEVICES BASED ON QUASI-PHASE-MATCHED INTERACTIONS IN DISPERSION-ENGINEERED NANOPHOTONICS

CROSS REFERENCE TO RELATED APPLICATIONS

This application claims priority from U.S. Provisional Patent Application 62/989,332 filed Mar. 13, 2020, which is incorporated herein by reference.

GOVERNMENT SPONSORSHIP

This invention was made with Government support under contract FA9550-14-1-0389 awarded by the Air Force Office of Scientific Research, under contracts W911NF-15-2-0060 and W911NF-18-1-0285 awarded by the U.S. Army Research Laboratory, and under contracts 1609549, 1609688, and 1741651 awarded by the National Science Foundation. The Government has certain rights in the invention.

FIELD OF THE INVENTION

This invention relates to improved nonlinear optical devices.

BACKGROUND

Nonlinear optical devices with quadratic nonlinearities are crucial components in modern nonlinear optical systems, where processes such as frequency mixing, harmonic generation, spectral broadening, and parametric amplification are used to generate and amplify coherent laser light at frequencies not present at the input to the device. The most efficient devices combine short optical pulses with quasi-phase-matching to achieve nonlinear frequency conversion with the large fields present at the peak of the pulse. The ability to use short pulses is ultimately limited by dispersion, which causes the pulses formed at different frequencies to walk off of one another due to the different group-velocities of the interacting waves. In the absence of temporal walk-off, higher order dispersion causes short pulses to chirp, thereby reducing the peak field of the pulse. These limitations ultimately constrain the current state of the art to short devices and picojoule scales.

SUMMARY

We have developed nonlinear optical devices that combine quasi-phase-matching with nanophotonic waveguides to achieve efficient nonlinear interactions of femtosecond pulses over length scales an order of magnitude larger than the current state of the art. The crucial breakthrough is the change in dispersion due to sub-wavelength confinement; light propagates with a different velocity in nanophotonic waveguides, and the waveguide geometry can be chosen to achieve simultaneous group-velocity matching between multiple interacting waves and reduced higher-order dispersion. Using these methods, we have developed and experimentally demonstrated several devices that achieve efficient spectral broadening and harmonic generation with the lowest energy requirements demonstrated to date. In the case of second-harmonic generation, these devices outperformed the state of the art by nearly two orders of magnitude.

Applications include, but are not limited to: Near- and mid-infrared light generation, ultra-short pulse compression, supercontinuum generation, frequency comb stabilization, upconversion detection, quantum frequency conversion, all-optical signal processing, coherent Ising machines, and the generation of nonclassical states of light such as Fock states, heralded photons, squeezed states, and cat states.

Further application examples include:
1) Adiabatic soliton compressors, which generate single cycle pulses from a table-top mode-locked laser by exciting a soliton at the input and locally varying the cascade nonlinearity to locally compress the soliton shorter;
2) Frequency comb stabilization using interference between the first and second harmonic formed during adiabatic soliton compression;
3) A synchronously pumped optical parametric oscillator, which embeds one of these devices inside of a resonator and drives it synchronously with a mode-locked laser. In theory such a system should function with 100 photons, or less, and could possibly be used as a source of non-classical light;
4) A Kerr microresonator, which functions similarly as the optical parametric oscillator, but forms pulses when driven by a continuous wave light source. The use of quasi-phase-matched nonlinear optics in a feedback loop should reduce the power required to excite a modelocked soliton state; and
5) A source of photon pairs with, ideally, a factorizable bi-photon wavefunction, using a combination of dispersion engineering and apodization of the quasi-phase-matching transfer function.

Significant advantages are provided. These devices combine two key techniques: 1) Quasi-phase-matching, which enables efficient interactions based on strong second-order nonlinearities, and 2) Dispersion engineering in nanophotonic devices, which enables efficient interactions by allowing the use of femtosecond pulses of light. When these two techniques are combined in a quasi-phase-matched nanophotonic waveguide, the resulting interactions allow many typically used nonlinear interactions to be scaled to radically lower pulse energies. Recent demonstrations described below include second-harmonic generation using ~50× less pulse energy than the previous state of the art, and multi-octave supercontinuum generation with ~500× less pulse energy than previous demonstrations in ion-exchanged waveguides with quadratic nonlinearities. These techniques enable a new class of nonlinear devices that operate with orders of magnitude lower energy requirements than previous platforms.

FIGS. 1A (end view) and 1B (top view) show an exemplary embodiment of the invention. It includes a waveguide 102 configured to provide a nonlinear optical interaction between two or more interacting optical waves. Waveguide 102 is a strongly confining waveguide having at least one relevant lateral dimension of the waveguide being less than free space wavelengths of one or more of the interacting optical waves (preferably less than free space wavelengths of all of the interacting optical waves). In this example, the relevant lateral dimensions are ridge width 104, ridge height 106 and film thickness 108. Here it is assumed, as in the examples below, that the ridge is formed by removing material from a uniform core layer of thickness 108 as needed to form the ridge.

Note that dimension 110 of the structure of this specific example is not a relevant lateral dimension. In simulations it is typically taken to be infinite, and in experiments the ridges are separated from each other (and from other structures) as needed to avoid undesired lateral crosstalk etc. The mode images of FIG. 2A make this point clear. However, more complicated geometries including but not limited to patterning multiple coupled waveguides can also be used to achieve the dispersion engineering constraints considered here.

Waveguide 102 is quasi-phase-matched to provide control of a phase mismatch of the nonlinear optical interaction. Here, quasi-phase-matching (QPM) is any technique where a structural variation along the length of a waveguide is used to affect the phase matching of interacting waves. Thus it includes phase matching (e.g., for efficient second-harmonic generation) as well as deliberate phase mismatching (e.g., for supercontinuum generation). In the example of FIG. 1B, as well as in the examples below, this structural variation corresponds to ferroelectric domain inversions of a ferroelectric waveguide material, e.g., lithium niobate. Here 112 refers to this domain pattern.

Waveguide 102 is designed to satisfy dispersion design constraints at two or more dispersion orders. Let $k(\omega)$ be the dispersion relation for a waveguide mode. Then $k''$, $k'''$, $k''''$ are the first, second, third, and fourth dispersion orders, where the primes denote differentiation of the propagation constant $k(\omega)$ with respect to w. More generally, the nth dispersion order is the nth derivative of $k(\omega)$ with respect to w.

Some exemplary dispersion design constraints relate to group velocity and group velocity dispersion as follows. In second-harmonic generation and degenerate optical parametric amplification, let $k_{FH}$, $k_{SH}$ be the propagation constants of the fundamental and second harmonic, respectively. Let $k'_{FH}=\partial k_{FH}/\partial \omega_{FH}$, $k'_{SH}=\partial k_{SH}/\partial \omega_{SH}$, correspond to the first dispersion order of the fundamental and second harmonic, respectively, and similarly define higher dispersion orders as above (i.e., $k''_{FH}$ corresponds to the second order dispersion of the fundamental). Then group velocity matching is the condition $|k'_{SH}-k'_{FH}|\leq 100$ fs/mm, more preferably $|k'_{SH}-k'_{FH}|\leq 10$ fs/mm. Group velocity dispersion (GVD) matching is the condition $|k''_{SH}-2k''_{FH}|\leq 100$ fs$^2$/mm, more preferably $|k''_{SH}-2k''_{FH}|\leq 20$ fs$^2$/mm. Group velocity dispersion minimization at the pump is the condition $|k''_{FH}|\leq 100$ fs$^2$/mm, more preferably $|k''_{FH}|\leq 20$ fs$^2$/mm.

In an embodiment, if the nonlinear optical interaction is quasi-phase-matched second-harmonic generation, the dispersion design constraints are preferably $|k'_{SH}-k'_{FH}|\leq 100$ fs/mm and $|k''_{FH}|\leq 100$ fs$^2$/mm and more preferably $|k'_{SH}-k'_{FH}|\leq 10$ fs/mm and $|k''_{FH}|\leq 20$ fs$^2$/mm (i.e., group velocity matching and pump group velocity dispersion minimization). For second-harmonic generation driven by short pulses, the two dominant dispersion orders are the group-velocity mismatch between the fundamental and the second harmonic ($|k'_{SH}-k'_{FH}|$) and the group-velocity dispersion of the fundamental ($|k''_{FH}|$). The group-velocity mismatch limits the possible bandwidth generated at the second harmonic, and the group-velocity dispersion limits the amount of fundamental bandwidth that can be used to drive SHG. This case is described in detail below.

In another embodiment, if the nonlinear optical interaction is supercontinuum generation from a phase-mismatched second-order nonlinearity, the dispersion design constraints are preferably $|k'_{SH}-k'_{FH}|\leq 100$ fs/mm and $|k''_{FH}|\leq 100$ fs$^2$/mm and more preferably $|k'_{SH}-k'_{FH}|\leq 10$ fs/mm and $|k''_{FH}|\leq 20$ fs$^2$/mm (i.e., group-velocity matching and pump group velocity dispersion minimization).

In another embodiment, if the nonlinear optical interaction is quasi-phase-matched degenerate optical parametric amplification, the dispersion design constraints are preferably $|k'_{SH}-k'_{FH}|\leq 100$ fs/mm and $|k''_{FH}|\leq 100$ fs$^2$/mm and more preferably $|k'_{SH}-k'_{FH}|\leq 10$ fs/mm and $|k''_{FH}|\leq 20$ fs$^2$/mm (i.e., group velocity matching and pump group-velocity dispersion minimization).

Quasi-phase-matching can be provided by a periodic structure (e.g., periodic poling 112 on FIG. 1B) or by an aperiodic structure (e.g., aperiodic poling 114 on FIG. 1C).

The waveguide can be configured as a resonator to provide resonance of some or all of the interacting optical waves. FIG. 1D (top view) shows an example, where ring resonator 116 is formed by a waveguide loop coupled to another waveguide 118. Ring resonator 116 is quasi-phase-matched around part (or all) of its circumference.

DETAILED DESCRIPTION

Figure 1A:
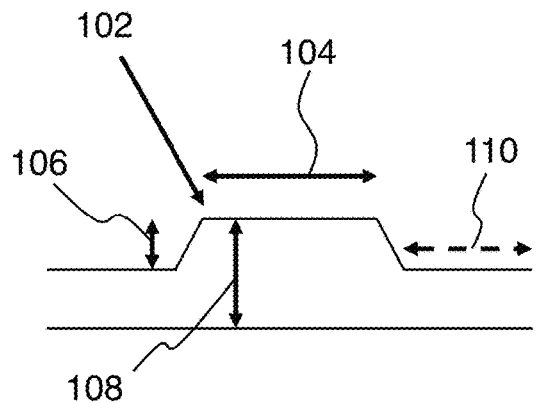
FIGS. 1A-D show some exemplary embodiments of the invention.
Figure 1B:
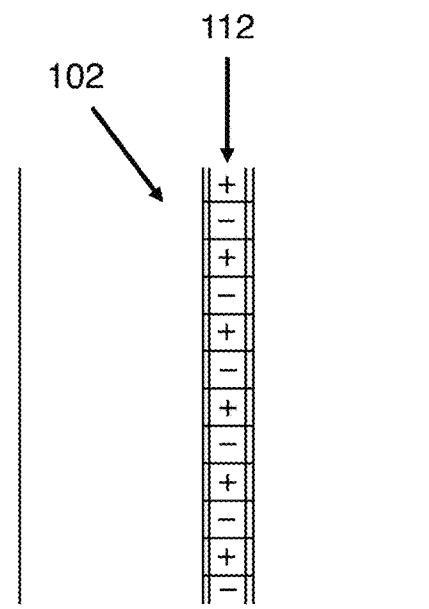
Figure 1C:
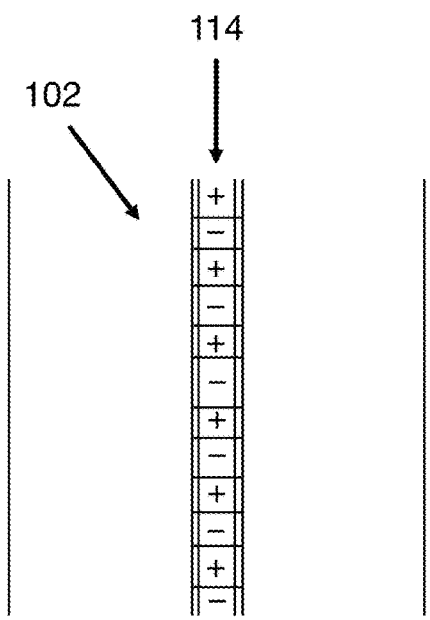
Figure 1D:
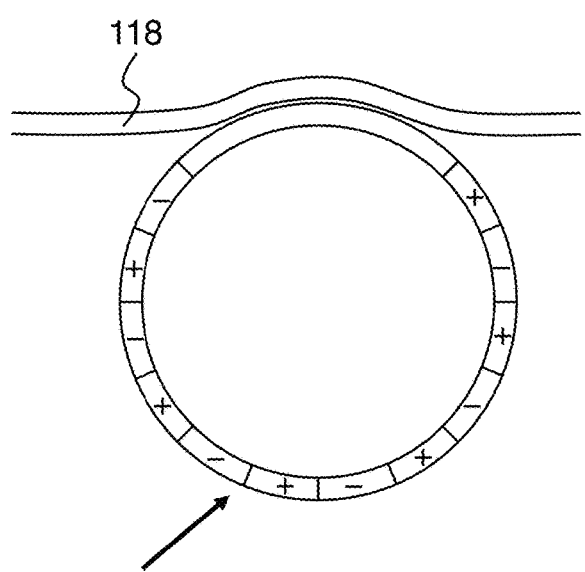

Here simulations and experiments relating to the above-described principles are described.

1) Introduction

Phase-matched interactions in materials with quadratic ($\chi^2$) nonlinearities are crucial for realizing efficient second-harmonic generation (SHG), sum- and difference-frequency generation, and optical parametric amplification. These dynamical processes are used as building blocks in many modern optical systems, including near- and mid-infrared light generation, ultrashort pulse compression, supercontinuum generation, frequency comb stabilization, upconversion detection and quantum frequency conversion, all-optical signal processing, coherent Ising machines, and the generation of nonclassical states of light. Weakly guiding diffused waveguides in periodically poled ferroelectrics like lithium niobate, lithium tantalate, and potassium titanyl phosphate are a commonly used platforms for such devices. These waveguides are conventionally formed by a small refractive index modulation ($\Delta n\sim 0.02$) due to in-diffused dopants and exhibit low-loss (~0.1 dB/cm) modes with field-diameters of ~5 µm, and quasi-phase-matched interactions between these modes through periodic poling of the $\chi^{(2)}$ coefficient. To date, these devices have suffered largely from two limitations. The power requirements of such devices are set by the largest achievable normalized efficiencies (90%/W-cm$^2$ for SHG of 1560-nm light), and the phase-matching bandwidths (and hence useful lengths for pulsed interactions) have ultimately been limited by the material dispersion that dominates over geometrical dispersion in weakly guiding waveguides.

Recent efforts have focused on the development of $\chi^{(2)}$ nanophotonics in platforms such as lithium niobate, aluminum nitride and gallium arsenide. These systems allow for densely integrated nonlinear photonic devices, and achieve efficient frequency conversion due to the large field intensities associated with sub-wavelength mode confinement. The current state of the art of $\chi^{(2)}$ nanophotonic devices considers two approaches: modal phase-matching using the geometric dependence of the phase-velocity of TE and TM modes, and quasi-phase-matching using waveguides with periodically poled $\chi^{(2)}$ nonlinearities. While modal phase-matching has achieved the largest normalized efficiencies to date (13,000%/W-cm$^2$), the waveguide geometry is determined by the conditions in which the phase velocity of the fundamental and second harmonic are matched. These constraints are lifted in quasi-phase-matched waveguides, where the waveguide geometry may be chosen to engineer both the group-velocity and the group-velocity dispersion of the interacting waves. The poling period necessary for quasi-phase-matched interactions is then determined by the phase-velocity mismatch in the chosen waveguide geometry. While engineering of these dispersion orders is often done in centrosymmetric waveguides, where the relative sign of the group-velocity dispersion and $\chi^{(3)}$ nonlinearity can be chosen to achieve soliton formation and spectral broadening, to date there has been no demonstration of dispersion-engineered quasi-phase-matched $\chi^{(2)}$ interactions.

In this work we use direct-etched nanophotonic periodically poled lithium niobate (PPLN) ridge waveguides to provide the first experimental demonstration of ultra-broadband quasi-phase-matched $\chi^{(2)}$ interactions in a dispersion-engineered waveguide. This description will proceed in three parts: In section 2, we briefly summarize the design and fabrication of nanophotonic PPLN waveguides, in section 3 we experimentally demonstrate second-harmonic generation in a dispersion-engineered PPLN waveguide, and in section 4 we experimentally demonstrate multi-octave supercontinuum generation in a phase-mismatched PPLN waveguide.

The devices shown in section 3, which have been designed for broadband SHG of wavelengths around 2 µm, exhibit SHG transfer functions with 3-dB bandwidths of >110 nm, and achieve a saturated SHG conversion efficiency in excess of 50% with pulse energies as low as 60 fJ when pumped with 50-fs-long pulses centered around 2 µm. The bandwidth and energy requirements of these waveguides represent an improvement over conventional waveguides by 10× and 30×, respectively.

In section 4, we choose the poling period of these waveguides for phase-mismatched SHG, which leads to self-phase modulation with an effective nonlinearity more than two orders of magnitude larger than the pure electronic $\chi^{(3)}$ of lithium niobate. When such a waveguide is driven with pulse energies in excess of a pJ it exhibits a cascade of mixing processes, resulting in the generation and spectral broadening of the first five harmonics. The techniques demonstrated here can be generalized to engineer the transfer functions and interaction lengths of any three-wave interaction based on $\chi^{(2)}$ nonlinearities, and will allow for many of the dynamical processes used in conventional PPLN devices to be scaled to substantially lower pulse energies.

2) Nanophotonic PPLN Waveguides

Figure 2A:
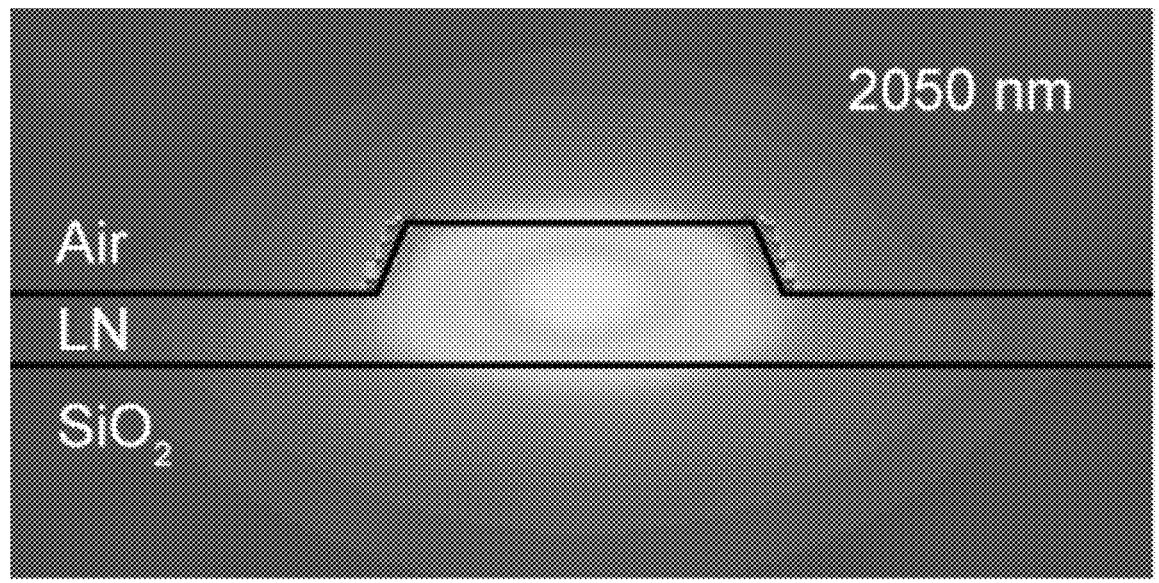
FIGS. 2A-E show waveguide design simulation results for efficiency, group-velocity matching, and minimization of first-harmonic group-velocity dispersion.
Figure 2A:
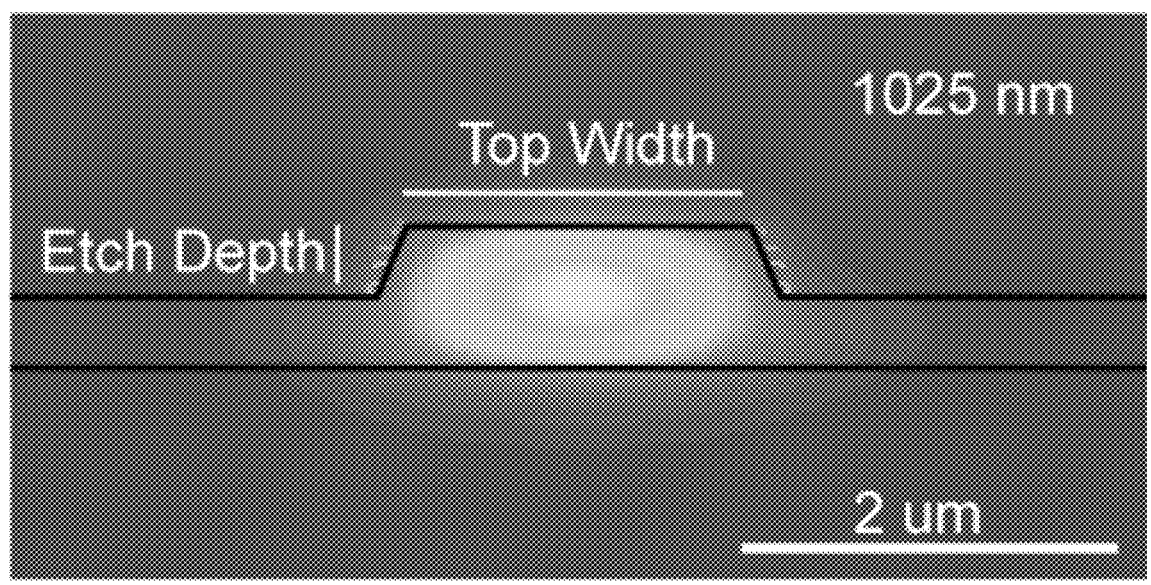
Figure 2B:
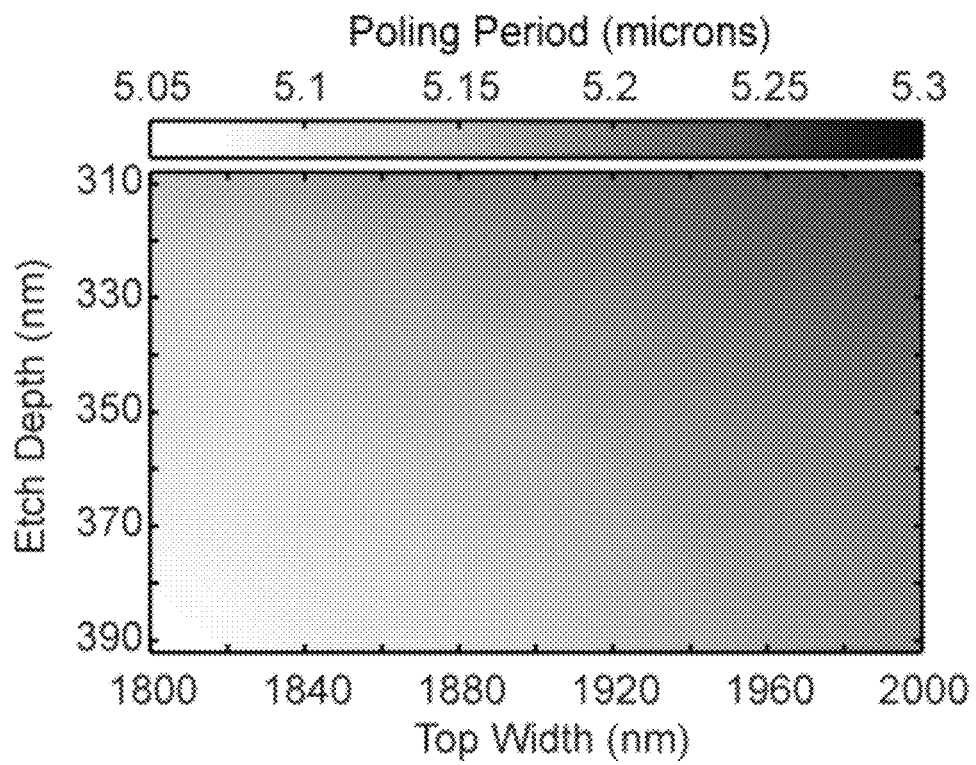
Figure 2C:
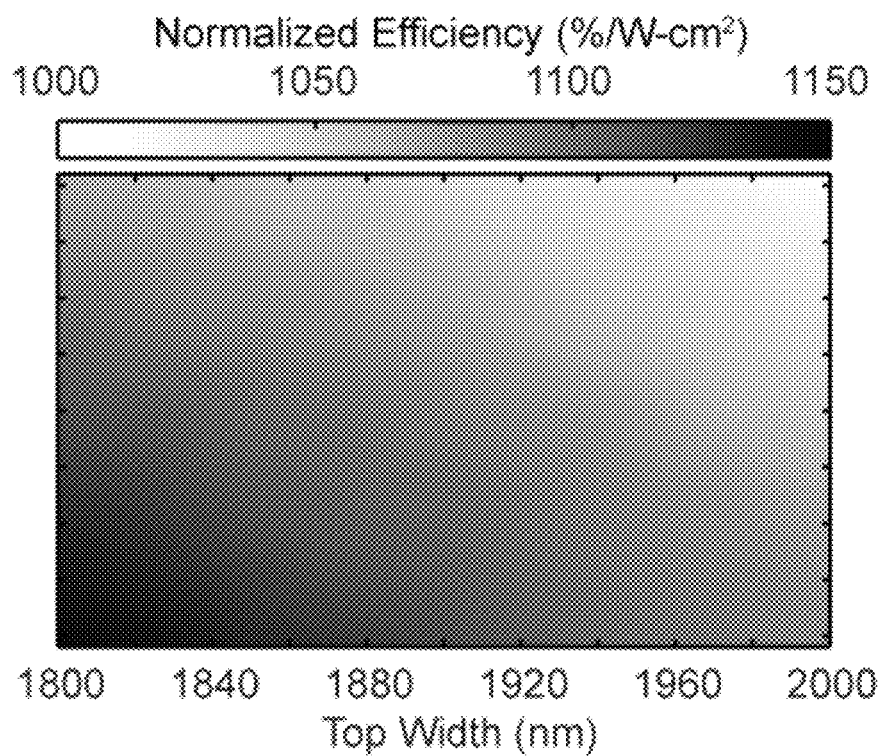

We begin by describing the design and fabrication of nanophotonic PPLN waveguides. A cross-section of a typical ridge waveguide is shown in FIG. 2A, with the simulated TE$_{00}$ modal field amplitude of the fundamental and second harmonic on the top and bottom, respectively. The waveguides shown here correspond to a top width of 1850 nm, an etch depth of 340 nm, and a starting film thickness of 700 nm. We consider a 700-nm-thick x-cut LN thin film, and examine the roles of etch depth and waveguide width on the performance of the waveguide. For continuous-wave (CW) interactions, the relevant parameters are the poling period needed to achieve phase matching, and the effective strength of the interaction. The required poling period for second-harmonic generation is given by $\Lambda=\lambda/(2n_{2\omega}-2n_\omega)$, where $\lambda$ is the wavelength of the fundamental, and $n_{\omega,2\omega}$ is the effective index of the fundamental and second harmonic modes, respectively. The poling period is shown as a function of waveguide geometry in FIG. 2B, and exhibits a linear scaling in width and etch depth, with larger waveguides having larger poling periods. The typical measure of nonlinearity is the normalized efficiency, $\eta_0$, which specifies the efficiency for phase-matched, undepleted, CW SHG in a nonlinear waveguide as $P_{2\omega}/P_\omega=\eta_0 P_\omega L^2$. $\eta_0$ is shown in FIG. 2C, and scales with the inverse of the area of the waveguide modes, $$\eta_0 = \frac{2\omega^2 d_{eff}^2}{n_\omega^2 n_{2\omega} \epsilon_0 c^3 A_{eff}}, \tag{1}$$

where $$d_{eff} = \frac{2}{\pi} d_{33}$$

is the effective nonlinear coefficient for quasi-phase-matched interactions that have been poled with a 50% duty cycle, and $d_{33}$=20.5 pm/V for SHG of 2050-nm light. This value is found using a least squares fit to the values reported in the literature and extrapolated to 2 um with constant Miller's delta scaling. $\lambda_{eff}$ is the effective area of the interaction and is 1.6 µm$^2$ for SHG between the modes shown in FIG. 2A.

The role of dispersion will be discussed in more detail in the following sections. We note, for completeness, that the bandwidth of nonlinear interactions is usually dominated by mismatch of the inverse group velocities of the interacting waves, hereafter referred to as the temporal walkoff or group-velocity mismatch, $\Delta k'$. In the absence of temporal walkoff, the group velocity dispersion of the fundamental, $k_\omega''$, plays a dominant role. $\Delta k'$ and $k_\omega''$ are shown in FIG. 2D and FIG. 2E respectively.

Figure 2D:
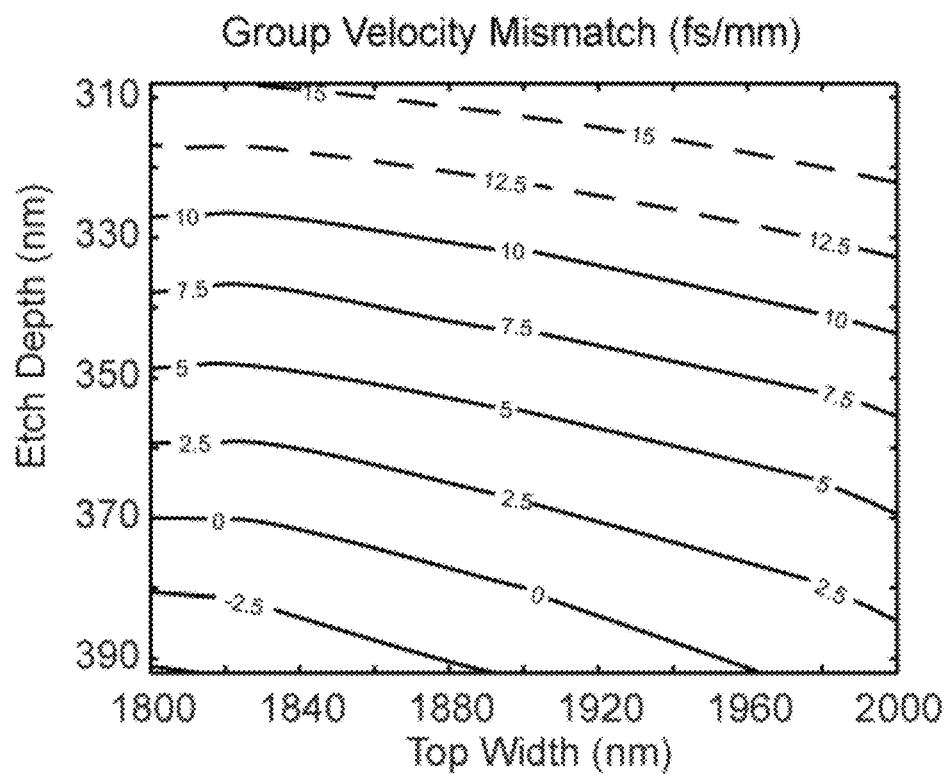
Figure 2E:
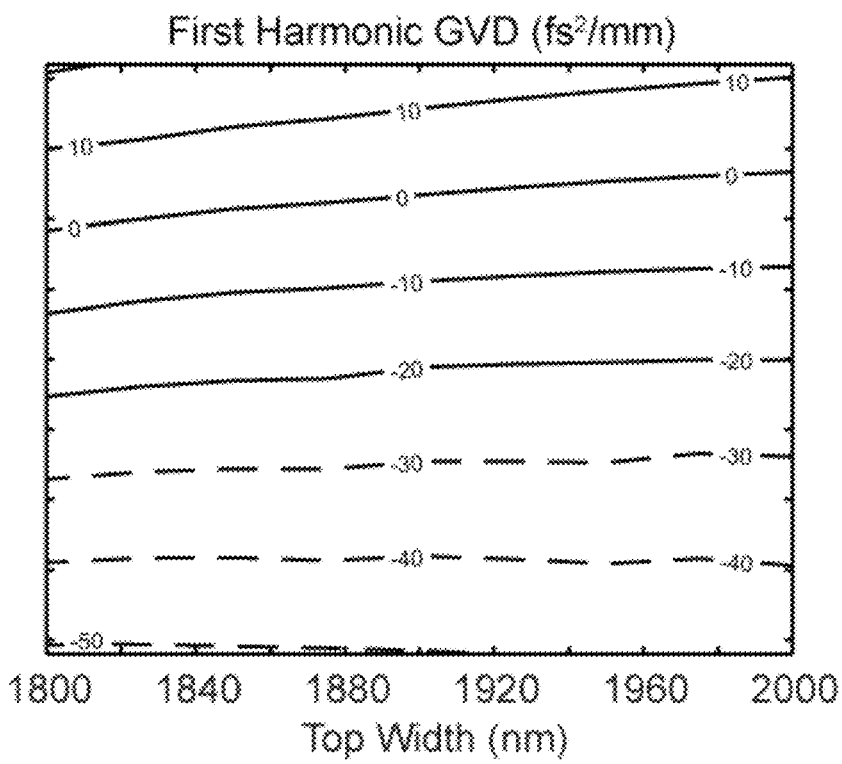

FIG. 2D shows simulated group-velocity mismatch. The solid black lines denote group-velocity matching ($|k'_{SH}-k'_{FH}|\leq10$ fs/mm), and the dashed black contour line shows geometries that achieve $|k'_{SH}-k'_{FH}|\leq100$ fs/mm. FIG. 2E shows simulated $k''_{FH}$. The solid black lines show geometries that achieve $|k''_{FH}|\leq20$ fs$^2$/mm, and dashed black lines denote geometries that achieve $|k''_{FH}|\leq50$ fs$^2$/mm. Temporal walkoff becomes negligible for etch depths >350 nm, and anomalous dispersion occurs at wavelengths around 2050 nm for etch depths >330 nm.

Figure 3A:
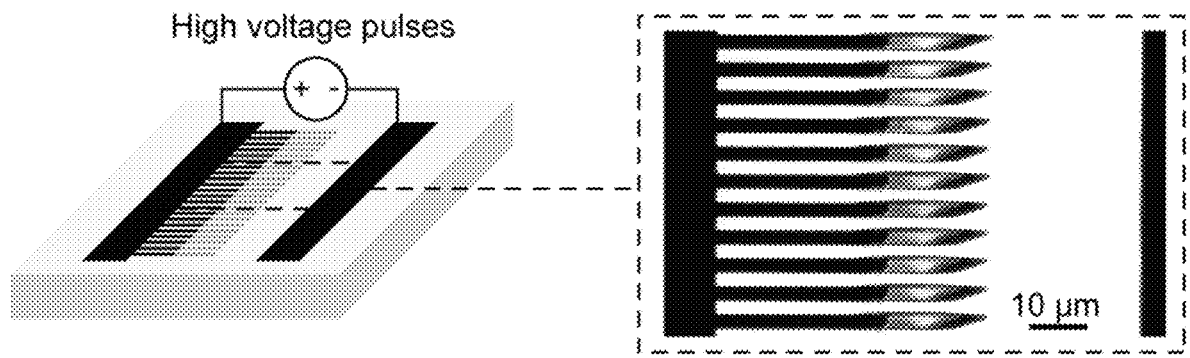
FIGS. 3A-C show waveguide fabrication for the experimental devices of this work.
Figure 3B:
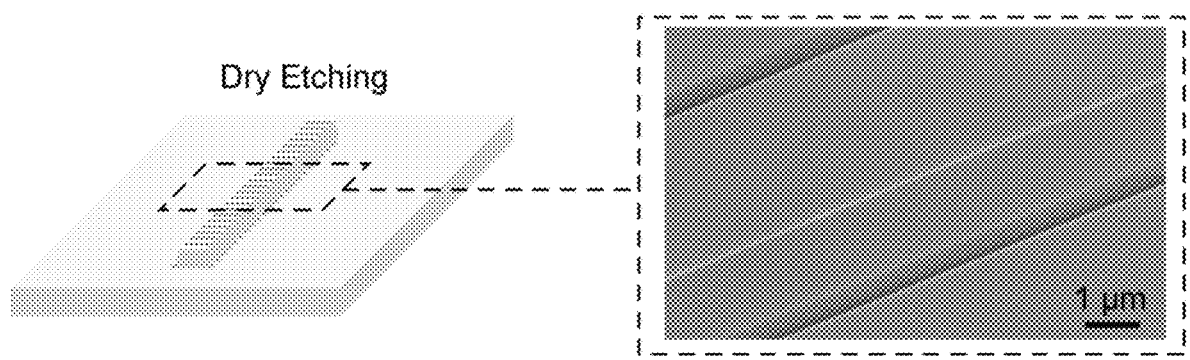
Figure 3C:
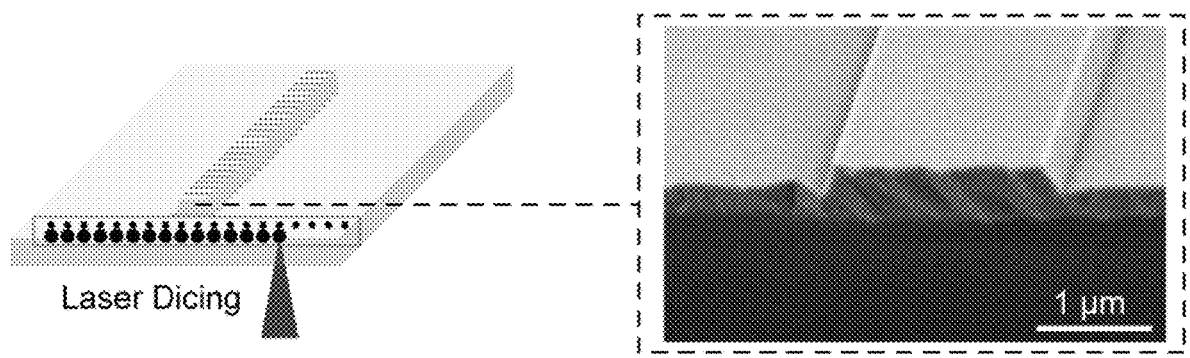

We conclude this section by briefly summarizing the fabrication of the nanophotonic PPLN waveguides used for the remainder of this work. For the periodic poling, metal electrodes are deposited and patterned on an x-cut magnesium-oxide-(MgO-) doped lithium niobate thin film. Then, several high-voltage pulses are applied to the electrodes, resulting in periodic domain inversions (FIG. 3A). The inset of FIG. 3A shows a colorized 2-photon microscope image of the resulting inverted domains with a duty cycle of ~50%. Second, waveguides are patterned using electron-beam lithography and dry etched using Ar+ ions. This process yields low-loss (<0.1-dB/cm) ridge waveguides (FIG. 3B). The inset of FIG. 3B shows a scanning electron microscope (SEM) image of the ridge waveguides, showing smooth sidewalls. Finally, facet preparation is done using a DISCO DFL7340 laser saw (FIG. 3C). Here, ~10-µJ pulses are focused into the substrate to create a periodic array of damage spots, which act as nucleation sites for crack propagation. The sample is then cleaved. The inset of FIG. 3C shows an SEM image of the resulting end-facets, which exhibit ~10-nm facet roughness.

Using these methods, we fabricated 45 6-mm-long (L) waveguides corresponding to three different top widths and 15 poling periods ranging from 5.01 µm to 5.15 µm. We chose the 10-nm shift between consecutive poling periods to correspond to a shift of $\Delta kL$ by $2\pi$, and use temperature for fine tuning of the phase mismatch. The yield for poling and waveguide fabrication was 50% and 90%, respectively, and the coupling efficiency varied from 0.03% to 1% depending on the quality of the end-facet, with 10% of the waveguides exhibiting facet damage. We note here that theoretical coupling efficiencies in excess of 30% are possible with the NA=0.5 optics used throughout this work, and that further refinements of both the facet preparation recipe and the in-coupled Gaussian beam have yielded devices with coupling efficiencies commensurate with theory. For the remainder of this work we will report pulse energies internal to the waveguide and focus on waveguides with a top width of ~1850 nm and an etch depth of ~340 nm, which achieve phase-matching near a period of 5.11 µm. The resulting theoretical normalized efficiency is 1100%/W-cm$^2$, $\Delta k'=5$ fs/mm, and $k_\omega''=\sim 15$ fs$^2$/mm. The calculated value of $\Delta k'$ is 20 times smaller than that of bulk lithium niobate for 2-µm doubling, which allows for substantially longer interaction lengths for femtosecond pulses.

3) Second-Harmonic Generation

In this section we discuss SHG of femtosecond pulses in a nanophotonic PPLN waveguide. We begin by explaining the role of dispersion engineering in phase-matched interactions, and how ultra-broadband phase-matched interactions become possible with a suitable choice of waveguide geometry. Then, we describe an experimental demonstration of SHG in a dispersion-engineered PPLN waveguide. The performance of these waveguides, as characterized by the SHG transfer function and normalized efficiency, agrees well with theory and represents an improvement over the performance of conventional PPLN devices in terms of both bandwidth and normalized efficiency by more than an order of magnitude.

The coupled wave equations for second-harmonic generation of an ultrafast pulse are $$\partial_z A_\omega(z,t) = -i\kappa A_{2\omega} A_\omega^* \exp(-i\Delta k z) + \hat{D}_\omega A_\omega$$

$$\partial_z A_{2\omega}(z,t) = -i\kappa A_\omega^2 \exp(i\Delta k z) - \Delta k' \partial_t A_{2\omega} + \hat{D}_{2\omega} A_{2\omega} \quad (2)$$

where $A_\omega$ and $A_{2\omega}$ are the complex amplitudes of the modal fields, normalized so that $|A(z,t)|^2$ is the instantaneous power at position z. $\kappa$ is the nonlinear coupling, $\kappa = \sqrt{\eta_0}$, and $\Delta k$ is the phase mismatch between the carrier frequencies, $\Delta k = k_{2\omega} - 2k_\omega - 2\pi/\Lambda$. The dispersion operator, $$\hat{D}_\omega = \sum_{j=2}^{\infty} [(-i)^{j+1} k_\omega^{(j)} / j!] \partial_t^j,$$

contains contributions beyond first order, where $k_\omega^{(j)}$ represents the jth derivative of propagation constant k at frequency $\omega$.

For SHG in the limit where the fundamental wave is undepleted, these equations may be solved using a transfer function approach. Here, the response of the second harmonic to the driving nonlinear polarization is computed by filtering the driving polarization with the transfer function for CW SHG. We implement this approach analytically in two steps. First we calculate the second-harmonic envelope that would be generated in the absence of dispersion, $A_{2\omega}^{ND}(z,t) = -i\kappa A_\omega^2(0,t)z$. Then, the power spectral density associated with this envelope is filtered in the frequency domain, using the CW transfer function for SHG $$|A_{2\omega}(z,\Omega)|^2 = \mathrm{sinc}^2(\Delta k(\Omega)z/2)|A_{2\omega}^{ND}(z,\Omega)|^2. \quad (3)$$

Here, $A_{2\omega}(z,\Omega) = F\{A_{2\omega}(z,t)\}(\Omega)$ is the Fourier transform of $A_{2\omega}(z,t)$, and $\Omega$ is the frequency detuning around $2\omega$. The dispersion of a nonlinear waveguide modifies the bandwidth of the SHG transfer function through the frequency dependence of $\Delta k(\Omega) = k(2\omega + 2\Omega) - 2k(\omega + \Omega) - 2\pi/\Lambda$. In conventional quasi-phase-matched devices, the bandwidth of the generated second harmonic is typically dominated by the group-velocity mismatch between the fundamental and second harmonic, $\Delta k(\Omega) \approx 2\Delta k'\Omega$, with corresponding scaling law for the generated second harmonic bandwidth $\Delta\lambda_{SHG} \propto 1/|\Delta k'|L$. As discussed previously, the geometric dispersion that arises due to tight confinement in a nanophotonic waveguide may substantially alter $\Delta k'$. Ultra-broadband interactions become possible when the geometric dispersion of a tightly confining waveguide achieves $\Delta k'=0$. For the waveguides fabricated here, both $\Delta k'$ and $k_\omega''$ are small. In this case the corresponding SHG bandwidth becomes dominated by higher order dispersion, and $\Delta k(\Omega)$ must be calculated using the full dispersion relations of the TE$_{00}$ fundamental and second harmonic modes.

Figure 4A:
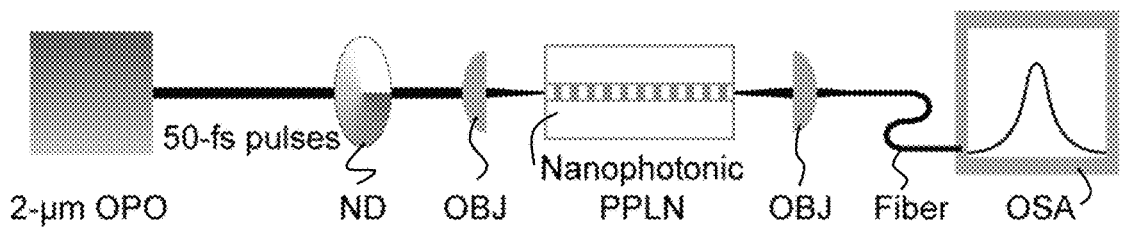
FIGS. 4A-E show characterization results for second-harmonic generation from the experimental devices of this work.
Figure 4B:
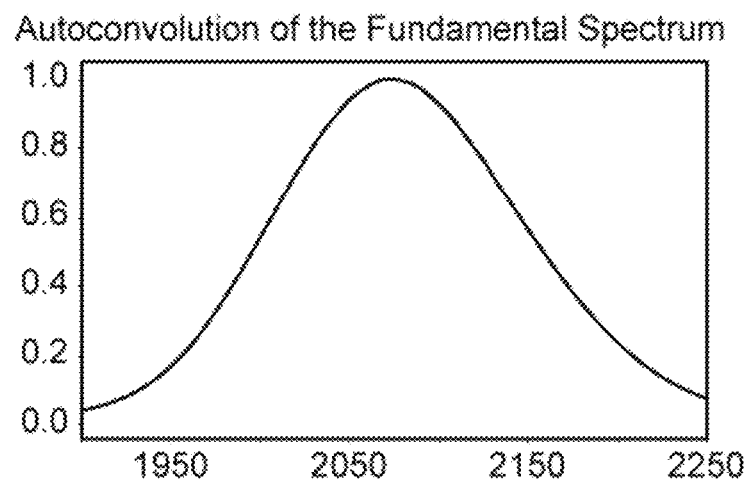
Figure 4C:
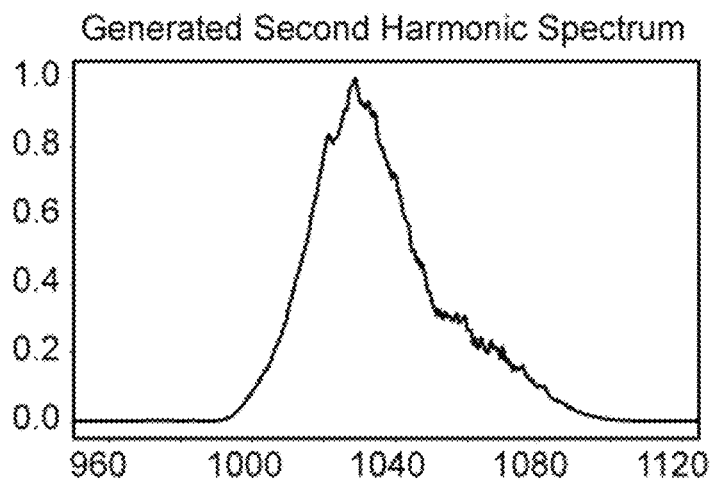
Figure 4D:
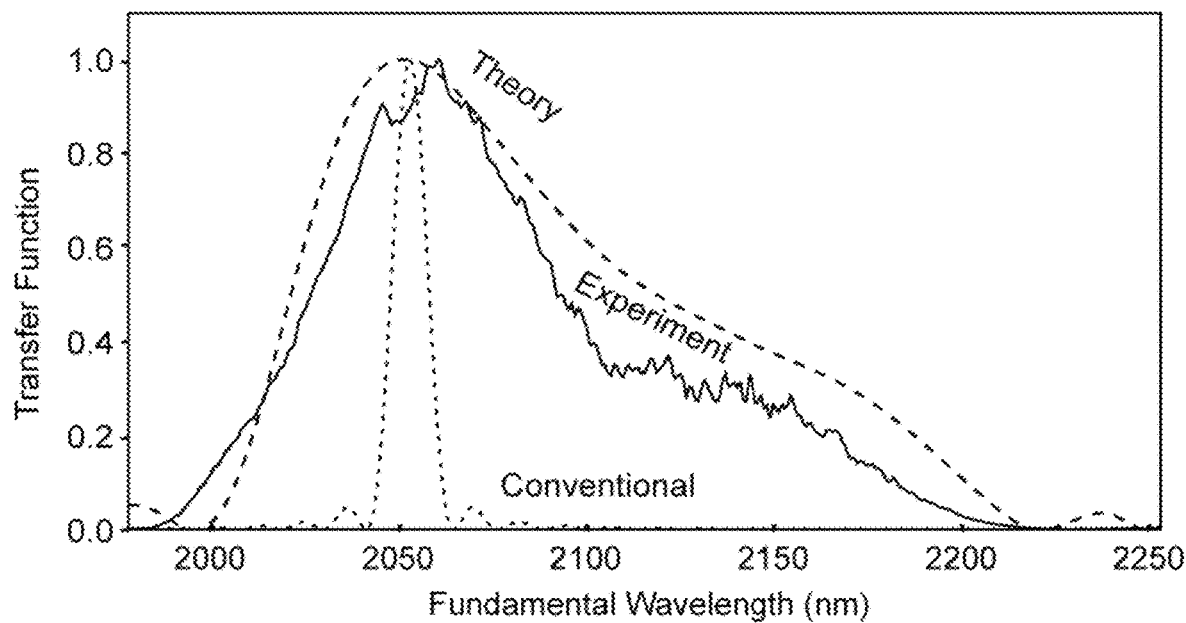

The experimental setup is shown in FIG. 4A. Here ND is a variable neutral density filter, OBJ is a reflective objective lens, and OSA is an optical spectrum analyzer. We characterize the behavior of the nanophotonic PPLN waveguides using nearly transform-limited 50-fs-long pulses from a synchronously pumped degenerate optical parametric oscillator (OPO). The OPO used here has a repetition frequency of 75 MHz. We use reflective objective lenses (Thorlabs LMM-40X-P01) both to couple into the sample and to collect the output. This ensures that the in-coupled pulses are chirp-free, and that the collected harmonics are free of chromatic aberrations. To characterize the SHG transfer function, we record the spectrum input to the waveguide at the fundamental and output from the waveguide at the second harmonic. Then, we estimate $A_{2\omega}^{ND}(z,\Omega) \propto A_\omega(z,\Omega) * A_\omega(z,\Omega)$ using the auto-convolution of the spectrum of the fundamental, shown in FIG. 4B. The ratio of the measured second-harmonic spectrum (FIG. 4C) with $A_{2\omega}^{ND}$ yields the measured SHG transfer function (FIG. 4D), showing good agreement between experiment and theory. Here the solid black curve is the measured SHG transfer function, the dashed curve labeled 'Theory' is a corresponding simulation, and the SHG transfer function of a comparable bulk PPLN device is shown with a dotted line.

Figure 4E:
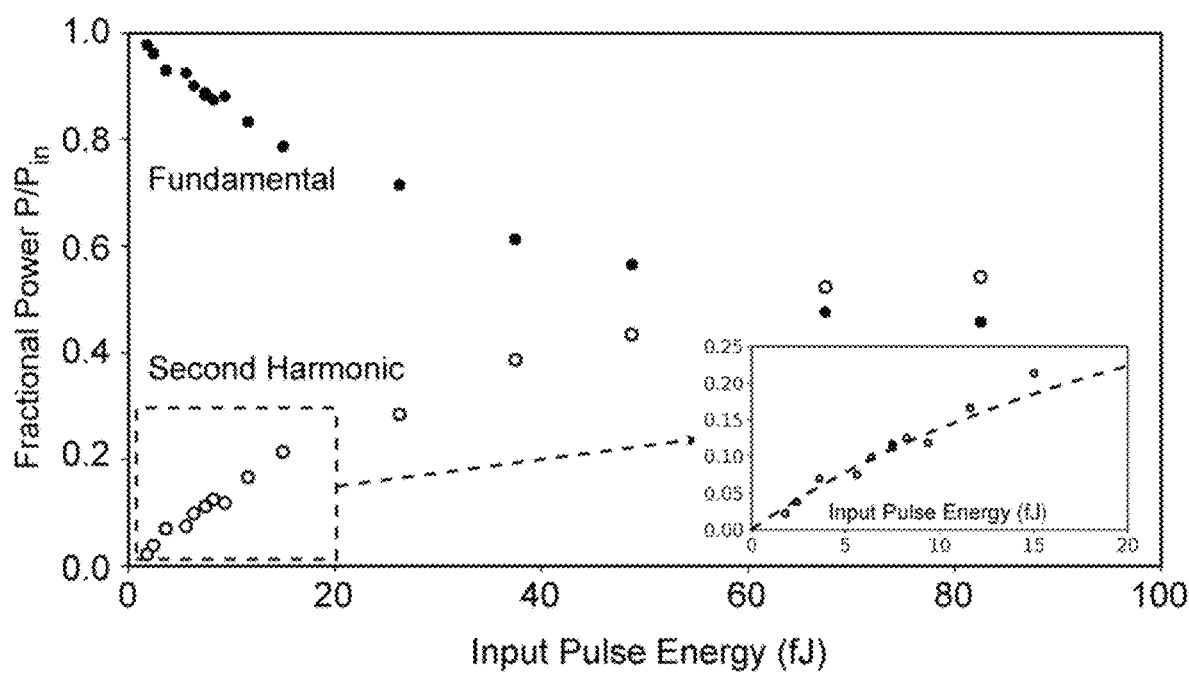

These devices exhibit a 3-dB bandwidth >110 nm, which outperforms bulk 2-µm SHG devices of the same length in PPLN by an order of magnitude. This broad transfer function confirms that the waveguide achieves quasi-static interactions of short pulses across the length of the device. Furthermore, the strong agreement between the measured and theoretical transfer function verifies the calculated waveguide dispersion. The conversion efficiency of the second harmonic and depletion of the fundamental input to the waveguide is shown as a function of input pulse energy in FIG. 4E. The inset shows the undepleted regime, denoted by the dotted box in FIG. 4E. The dotted line is a theoretical fit of Eqn. (3), where we have accounted for a small degree of saturation at the peak of the pulse by using $A_{2\omega}^{ND}(z,t)=-iA_\omega(0,t)\tanh(\kappa A_\omega(0,t)z)$. The only fitting parameter used here is a peak CW normalized efficiency of 1000%/W-cm$^2$, which agrees well with the theoretically predicted value of 1100%/W-cm$^2$, and represents a 45-fold improvement over conventional 2-μm SHG devices based on proton-exchanged waveguides. When this large CW normalized efficiency is combined with the peak field associated with a 50-fs-long pulse, these waveguides achieve 50% conversion efficiency for an input pulse energy of only 60 fJ, which is a 30-fold reduction compared to the state of the art.

4) Supercontinuum Generation

In this section we discuss spectral broadening by cascaded nonlinearities in a nanophotonic PPLN waveguide. We begin by introducing a heuristic picture based on cascaded nonlinearities in phase-mismatched SHG, and discuss the role of dispersion. Based on this heuristic picture, we show that the effective nonlinearity of these waveguides exceeds than that of conventional $\chi^{(3)}$-based devices, including nanophotonic silicon waveguides. We then describe an experimental demonstration of supercontinuum generation (SCG) in a dispersion-engineered PPLN waveguide. The performance of these waveguides, as characterized by the pulse energies required to generate an octave of bandwidth at multiple harmonics, is an improvement over previous demonstrations in lithium niobate by more than an order of magnitude.

In the limit of large phase-mismatch, self-phase modulation of the fundamental occurs due to back-action of the second harmonic on fundamental. This can be seen by reducing the coupled wave equations to an effective nonlinear Schrödinger equation for the fundamental wave. We neglect dispersion beyond second order, and assume the phase-mismatch is sufficiently large to satisfy two criteria: $|\Delta k|\gg\kappa A_0$, where $A_0=\max(|A_\omega(0,t)|$, and $|\Delta k|\gg 4\pi|\Delta k'/\tau|$, where $\tau$ is the transform-limited duration of the pulse input to the waveguide. Under these conditions, Eqns. (2) become $$\partial_z A_\omega = \frac{ik_\omega''}{2}\partial_t^2 A_\omega + i\gamma_{SPM}|A_\omega|^2 A_\omega, \quad (4)$$

where $\gamma_{SPM}=-\eta_0/\Delta k$. Typically, the bounds on $\Delta k$, and thus the strength of the effective self-phase modulation, are set by the temporal walk-off. This constraint is lifted when $\Delta k'\sim 0$. For modest values of the phase mismatch ($\Delta k\sim 1$ mm$^{-1}$) and the CW normalized efficiency measured previously, the effective nonlinearity is $\gamma_{SPM}=100$/W-m. This corresponds to an effective nonlinear refractive index of $n_2=4.8\times 10^{-17}$ m$^2$/W. We may compare this to the $n_2$ associated with Kerr nonlinearities in lithium niobate by scaling the values found in the literature with a two-band model. We find $n_2=2.6\times 10^{-19}$ m$^2$/W at 2050 nm, which is nearly 200 times weaker than the self-phase modulation due to cascaded nonlinearities. The $\gamma_{SPM}$ shown here also exceeds typical values in common nanophotonic platforms using Kerr nonlinearities. Recent demonstrations of SCG in silicon, silicon nitride, and lithium niobate achieved a $\gamma_{SPM}$ of 38/W-m, 3.25/W-m, and 0.4/W-m, respectively.

Figure 5A:
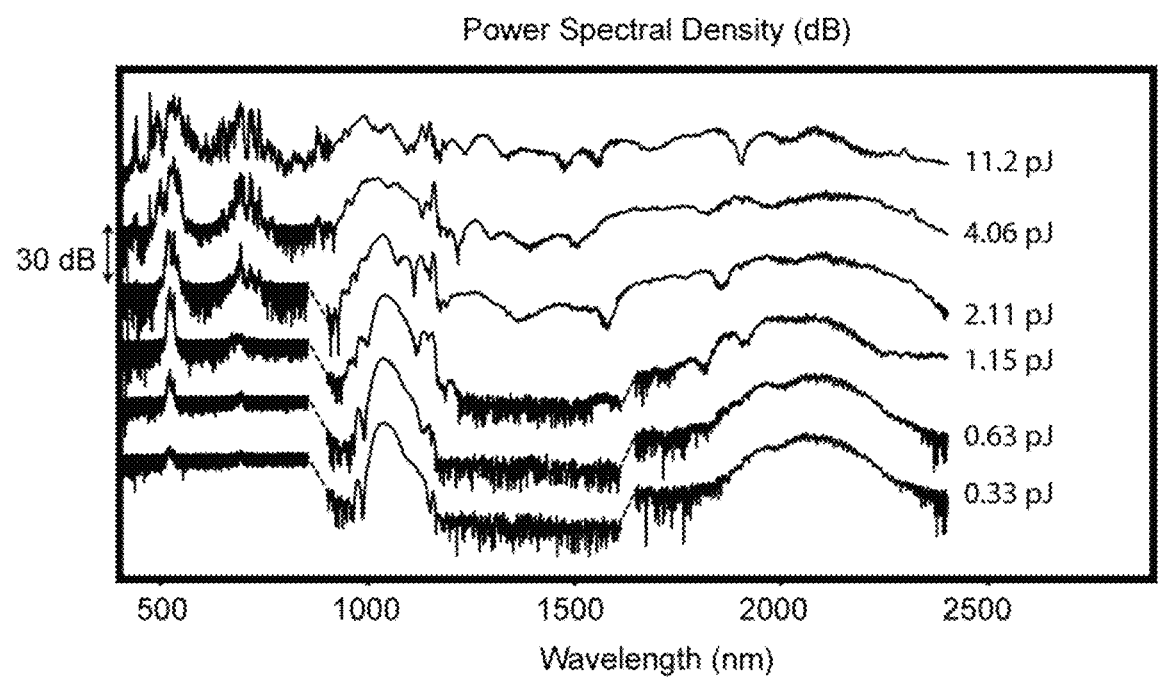
FIGS. 5A-B show characterization results for supercontinuum generation from the experimental devices of this work.
Figure 5B:
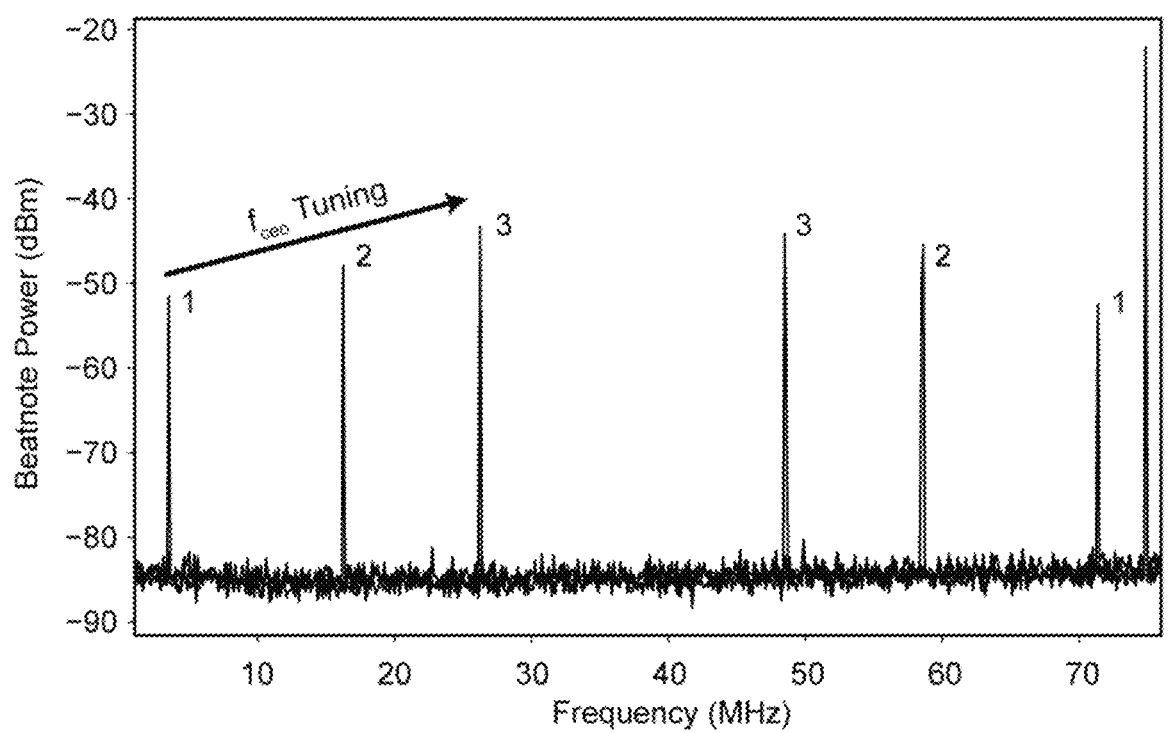

In addition to an enhanced nonlinearity, the spectral broadening due to cascaded nonlinearities is not limited to the fundamental. The full nonlinear polarization generates a cascade of mixing processes, which leads to spectral broadening of several harmonics. While a heuristic picture of this process is beyond the scope of this work, this behavior is readily observed in experiments. FIG. 5A shows evolution of power spectral density over an order of magnitude variation of pulse energy. Adjacent traces are displaced by 30 dB for clarity. The different noise floors correspond to the three spectrometers used. FIG. 5B shows measured carrier-envelope-offset beat notes, which confirm the coherence of the generated supercontinuum.

We characterize SCG in a nanophotonic PPLN waveguide with the OPO source and waveguide geometry used in the SHG experiment, however we now choose a 5.10-μm poling period such that $\Delta k L=-3\pi$. We record the output spectrum from the waveguide using three spectrometers: the visible to near-infrared (400-900 nm) range is captured with an Ocean Optics USB4000, the near- to mid-infrared (900-1600 nm) is captured with a Yokogawa AQ6370C, and the mid-infrared (1600-2400 nm) is captured using a Yokogawa AQ6375. The results are shown in FIGS. 5A-B. The fundamental, second harmonic, and fourth harmonic are observed for input pulse energies as low as 0.5 pJ. For pulse energies >1 pJ, the first two harmonics undergo spectral broadening, and we observe buildup of the third harmonic. As the waveguide is driven with larger pulse energies, all of the observed harmonics undergo spectral broadening. The first two harmonics merge into a supercontinuum spanning more than an octave when driven with 2 pJ of pulse energy. When driven with pulse energies in excess of 10 pJ, the first five harmonics undergo spectral broadening and merge together to form a supercontinuum spanning >2.5 octaves at the −30 dB level. The measured supercontinuum is limited to wavelengths >400 nm by the transparency window of our collection optics, and <2400 nm by our available spectrometers.

To characterize the coherence of this multi-octave supercontinuum, we measure the carrier-envelope-offset frequency ($f_{ceo}$) using beatnotes that arise due to the overlap of the fundamental and second harmonic. The experimental setup is the same as for SHG and SCG, except that the light output from the waveguide is filtered using a Thorlabs FELH-1350 long-pass filter, and focused onto a Hamamatsu C12668-02 InGaAs photoreceiver. The recorded $f_{ceo}$ beatnotes are shown in FIG. 5B, alongside a 75 MHz beat note corresponding to the repetition frequency of the OPO. We verify that the observed beat notes correspond to the $f_{ceo}$ by tuning the $f_{ceo}$ of the OPO in two steps: i) we tune the $f_{ceo}$ of the laser used to pump the OPO by translating an intracavity prism, and ii) we monitor the spectrum of the OPO to verify that it maintains degenerate operation, and therefore remains phase locked to the pump laser as the $f_{ceo}$ is tuned. We achieve a 35-dB signal-to-noise ratio in a 3-kHz resolution bandwidth, limited by the noise floor of the photoreceiver. Furthermore, we remark that the intensity of the $f_{ceo}$ beatnotes are only ~22 dB below the intensity of the repetition frequency beatnote. This bright relative intensity is due to the beat notes remaining coherent and in-phase across the entire 400-nm-wide bandwidth incident on the photodetector.

To better understand the dynamics and coherence properties of the generated supercontinuum, we simulate Eqns.

Figure 6A:
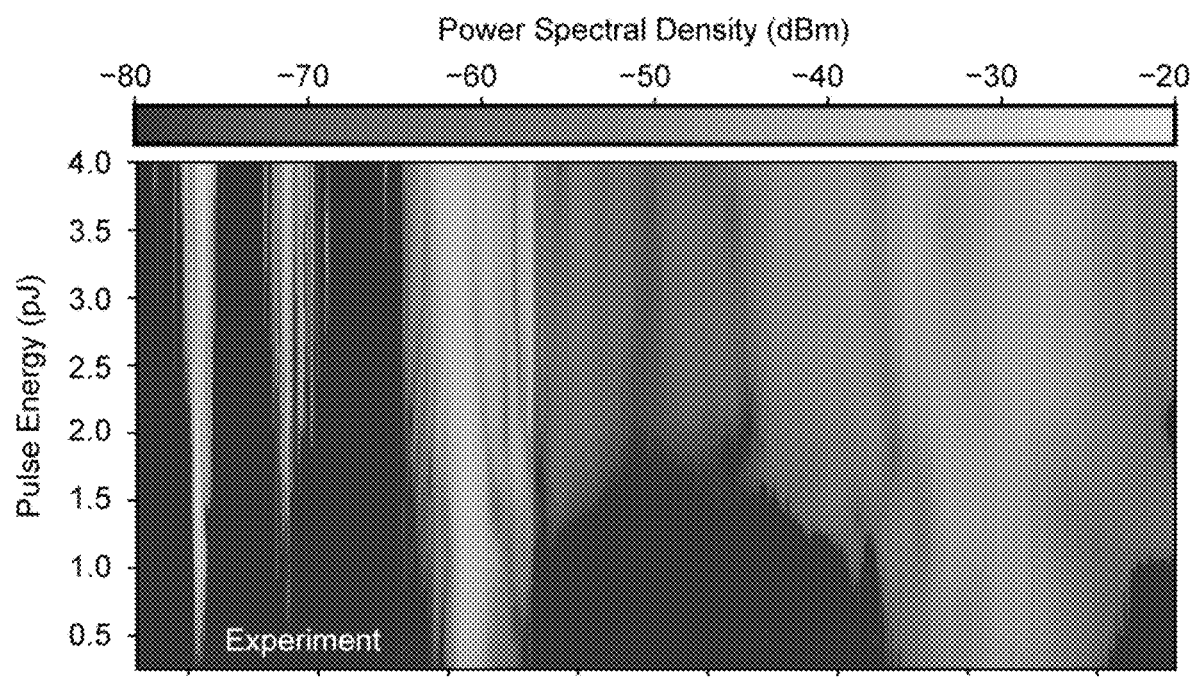
FIGS. 6A-B show further characterization results for supercontinuum generation from the experimental devices of this work.
Figure 6B:
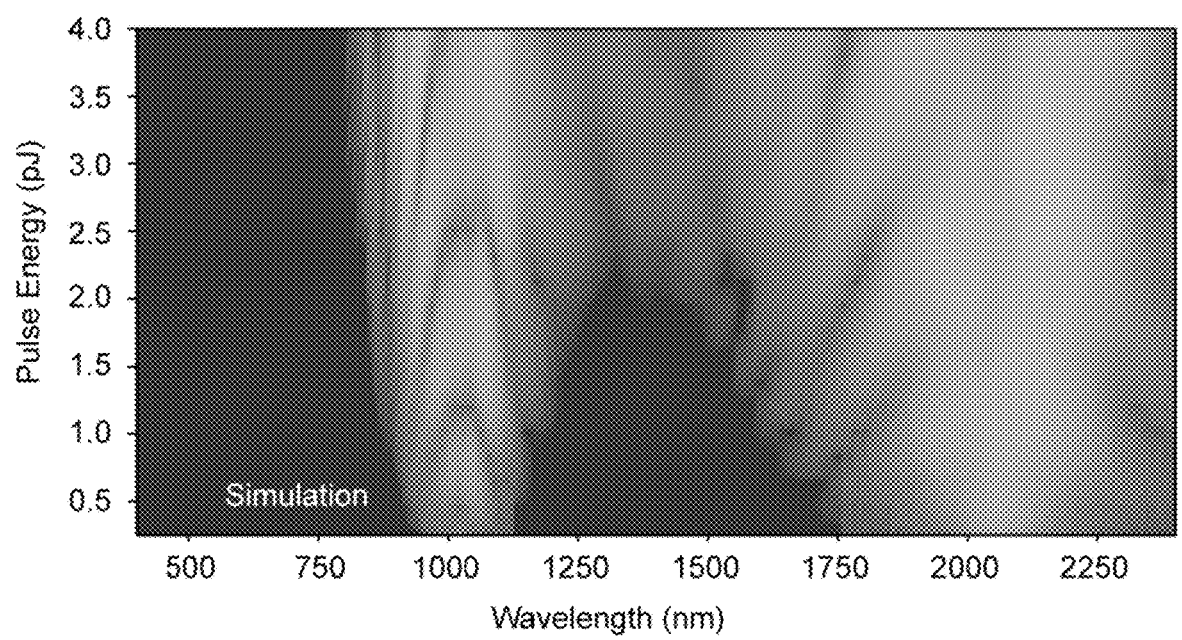

(2) numerically using the split-step Fourier method, which accounts for dispersion to third order and saturation. The experimentally measured and simulated spectra output from the waveguide are shown in FIGS. 6A and 6B, respectively. We note that the simulation includes semi-classical vacuum noise and that the results have been renormalized to account for outcoupling such that the simulation and experiment have the same peak-power spectral density in the near-infrared band (900-1600 nm) when driven with a pulse energy of 4 pJ. The two-envelope model used here captures many of the features of the experiment except for the buildup of the higher harmonics, which have been explicitly neglected by only considering $A_\omega$ and $A_{2\omega}$ in the coupled-wave equations. The observed spectral broadening agrees well with traditional heuristics derived from the nonlinear Schrödinger equation, which confirms that this broadening is due to a strong effective $\gamma_{SPM}$ that arises from back-action of the second harmonic on the fundamental.

If we define the soliton number as $N^2 = \gamma_{SPM} U \tau_s/(2k_\omega'')$, where U is the input pulse energy, and $\tau_s = \tau/1.76$, then the soliton-fission length is given by $L_s = \tau_s^2/Nk_\omega''$. The soliton-fission length approaches the length of the device for an input pulse energy of 1 pJ, which is the energy at which the observed output spectra begin to exhibit spectral broadening. Supercontinuum generation occurs for pulse energies in excess of 2 pJ. The simulated coherence function, $|g^{(1)}(\lambda,0)|$, has been calculated using an ensemble average of 100 simulations, for an input pulse energy of 4 pJ (N=14). These simulations suggest that the spectra are coherent over the range of pulse energies considered, with a calculated $<|g^{(1)}|> = \int |g^{(1)}(\lambda, 0)||A(\lambda)|^2 d\lambda/\int |A(\lambda)|^2 d\lambda$ of 0.9996 and 0.9990 for the fundamental and second harmonic, respectively. This suggests that decoherence mechanisms that arise due to back-action, such as modulation instabilities, are absent for the devices under study. However, we note that the approach used here neglects many possible decoherence mechanisms, such as degenerate parametric fluorescence of the third harmonic. Further theoretical and experimental study of the coherence properties of these supercontinua will be the subject of future work.

5) Conclusion

We have experimentally demonstrated both SHG and SCG in a dispersion-engineered nanophotonic PPLN waveguide. These waveguides are shown to exceed the performance of current-generation SHG devices by at least an order of magnitude in phase-matching bandwidth and pulse energy requirements. Similarly, they achieve self-phase modulation with larger nonlinearities than nanophotonic waveguides based on $\chi^{(3)}$ nonlinearities. These waveguides produce coherent multi-octave supercontinua including multiple spectrally broadened harmonics with at least an order of magnitude less pulse energy than previous demonstrations in lithium niobate waveguides. These dramatic reductions in energy requirements are made possible by combining the dispersion engineering and large $\eta_0$ available in nanophotonic waveguides with periodically poled $\chi^{(2)}$ nonlinearities. When these techniques are combined, they achieve highly efficient quasi-phase-matched interactions of femtosecond pulses over long propagation lengths, thereby enabling a new class of nonlinear photonic devices and systems.

6) Further Example

Figure 7:
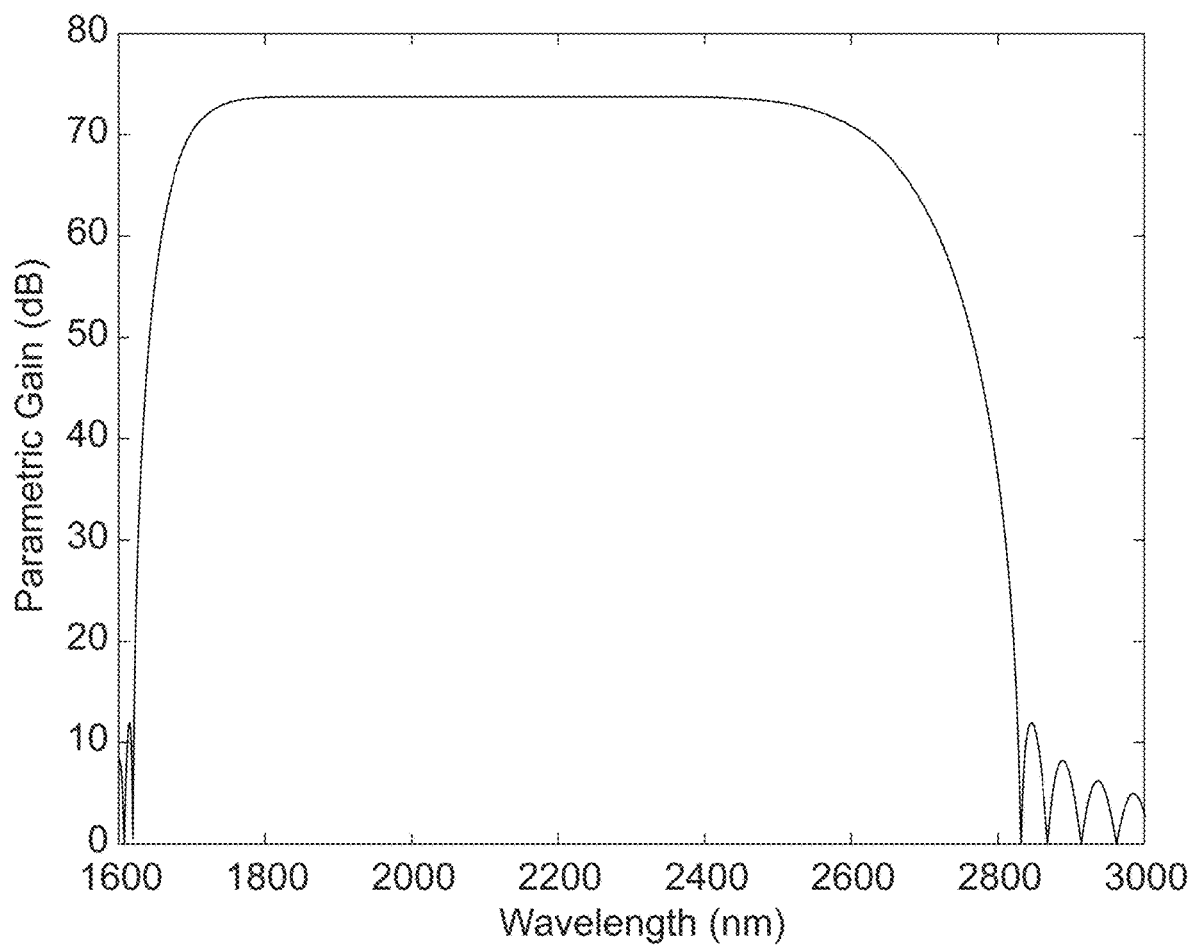
FIG. 7 shows simulated parametric gain for an embodiment of the invention.

Another nonlinear optical interaction for which the above-described principles apply is optical parametric amplification. For degenerate optical parametric amplification driven by short pulses, the two dominant dispersion orders are again the group-velocity mismatch between the fundamental and the second harmonic ($|k'_{SH} - k'_{FH}|$), and the group-velocity dispersion of the fundamental ($|k''_{FH}|$). In this case, the group-velocity mismatch limits the amount of second-harmonic bandwidth that can contribute to parametric amplification, or alternatively, the length of the device that can be used for parametric amplification given the pulse duration of the pump pulses. $|k''_{FH}|$ limits the amount of bandwidth that can be generated at wavelengths around the fundamental. If we consider devices as described above, driving one of these waveguides with 100-fs-long pulses from a 1045-nm mode-locked laser would yield >70 dB of gain across 1 um of bandwidth (1700 nm-2700 nm, FIG. 7) when using only 1 pJ of pulse energy.

The invention claimed is:

1. Apparatus comprising:
a waveguide configured to provide a nonlinear optical interaction between two or more interacting optical waves;
wherein the waveguide is a strongly confining waveguide having at least one relevant lateral dimension of the waveguide being less than free space wavelengths of one or more of the interacting optical waves;
wherein the waveguide is quasi-phase-matched to provide control of a phase mismatch of the nonlinear optical interaction;
wherein the waveguide is designed to satisfy dispersion design constraints at two or more dispersion orders.

2. The apparatus of claim 1, wherein the nonlinear optical interaction is quasi-phase-matched second-harmonic generation, and wherein the dispersion design constraints are $|k'_{SH} - k'_{FH}| \leq 100$ fs/mm and $|''_{FH}| \leq 100$ fs$^2$/mm.

3. The apparatus of claim 2, wherein the nonlinear optical interaction is quasi-phase-matched second-harmonic generation, and wherein the dispersion design constraints are $|k'_{SH} - k'_{FH}| \leq 10$ fs/mm and $|k''_{FH}| \leq 20$ fs$^2$/mm.

4. The apparatus of claim 1, wherein the nonlinear optical interaction is supercontinuum generation from a phase-mismatched second-order nonlinearity, and wherein the dispersion design constraints are $|k'_{SH} - k'_{FH}| \leq 100$ fs/mm and $|k''_{FH}| \leq 100$ fs$^2$/mm.

5. The apparatus of claim 4, wherein the nonlinear optical interaction is supercontinuum generation from a phase-mismatched second-order nonlinearity, and wherein the dispersion design constraints are $|k'_{SH} - k'_{FH}| \leq 10$ fs/mm and $|k''_{FH}| \leq 20$ fs$^2$/mm.

6. The apparatus of claim 1, wherein the nonlinear optical interaction is quasi-phase-matched degenerate optical parametric amplification, and wherein the dispersion design constraints are $|k'_{SH} - k'_{FH}| \leq 100$ fs/mm and $|k''_{FH}| \leq 100$ fs$^2$/mm.

7. The apparatus of claim 6, wherein the nonlinear optical interaction is quasi-phase-matched degenerate optical parametric amplification, and wherein the dispersion design constraints are $|k'_{SH} - k'_{FH}| \leq 10$ fs/mm and $|k''_{FH}| \leq 20$ fs$^2$/mm.

8. The apparatus of claim 1, wherein the waveguide is configured as a resonator to provide resonance of some or all of the interacting optical waves.

9. The apparatus of claim 1, wherein quasi-phase-matching of the waveguide is provided by a periodic structure.

10. The apparatus of claim 1, wherein quasi-phase-matching of the waveguide is provided by an aperiodic structure.

* * * * *